March 18, 1930. S. M. BIELEK 1,751,387
HEATING DEVICE
Filed Sept. 22, 1928
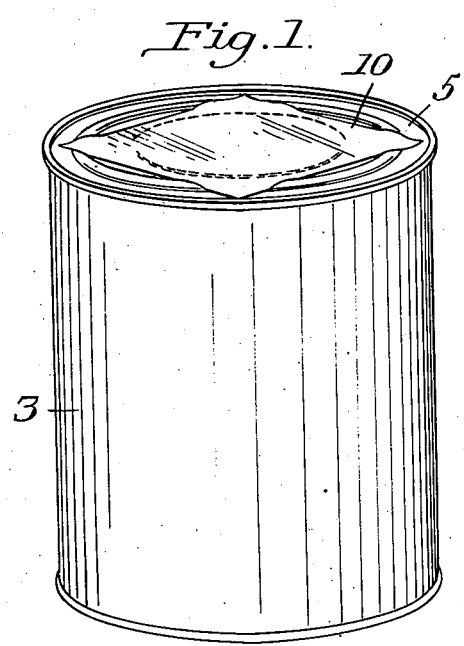
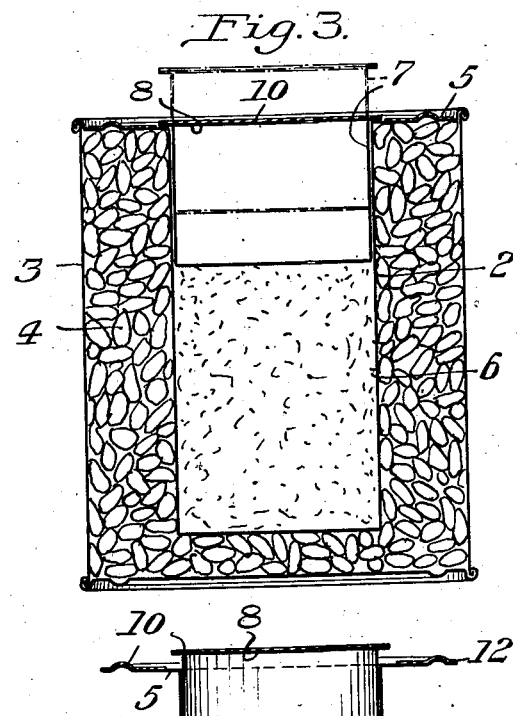
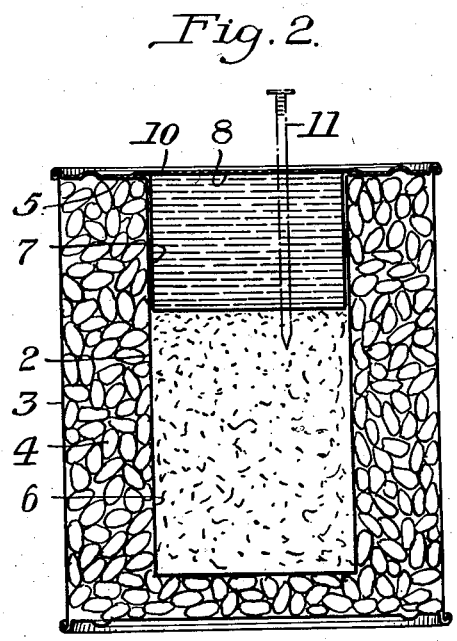
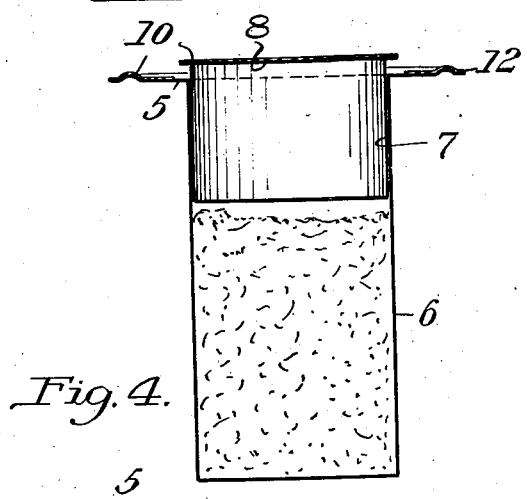
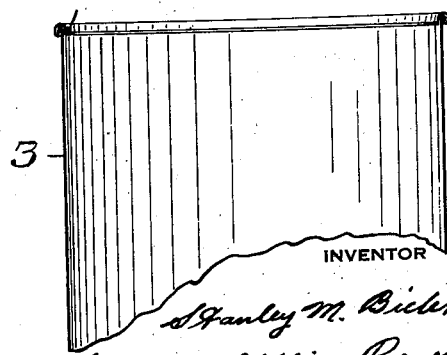
INVENTOR
Stanley M. Bielek Patented Mar. 18, 1930

1,751,387

UNITED STATES PATENT OFFICE

STANLEY M. BIELEK, OF PITTSBURGH, PENNSYLVANIA

HEATING DEVICE

Application filed September 22, 1928. Serial No. 307,661.

This invention relates generally to a heating device, and more particularly to a heating device which is arranged within a container during the heating operation and containing substances which when mixed, develop heat.

My invention provides a heating device which can be manufactured economically and which can be used for heating cans of material such as soups, beans and the like, without utilizing a fire.

In the accompanying drawings which illustrate the present preferred embodiment of my invention Figure 1 is a perspective of a container having the heating device embodying my invention associated therewith;

Figure 2 is a vertical section showing the relative position of the elements which form the heating device before the heating operation has been started;

Figure 3 is a similar view showing the relative position of the heating elements during the heating step; and Figure 4 is a vertical section showing the heating element withdrawn from the container and about to be thrown away.

Referring to the embodiment shown in the drawing, a heating device 2 is associated with a container 3. The container, which may be of any usual or desired construction, is adapted to contain the material to be heated. In the preferred embodiment illustrated in the drawing, I have shown a container having beans 4 therein which it is desired to heat. The container 2 is provided with a cover 5 which at its center is formed with a downwardly extending cylindrical portion 6 which forms a part of the heating device. The other part of the heating device comprises an element 7 which is arranged within the container 6. The element 7 is of a slightly smaller diameter than the cylindrical portion 6, so that the element 7 may readily slide with relation to the element 6. The element 7 has a cover or lid 8 which extends outwardly a slight distance beyond the body portion of the element so as to maintain the element 7 in the position shown in Figure 2 when the heating element is not in use.

The element 7 is prevented from falling out of the depending cylindrical portion 6 when the can is tipped, by a piece of paper 10 which is glued to the top of the container.

The elements 6 and 7 are adapted to receive substances which when mixed will react with the formation of heat. Any desired substances which liberate heat when mixed may be used, but I prefer to use lime in the element 6 and water in the element 7. When these substances are allowed to mix, in the manner hereinafter more fully described, the lime is slaked by the water and heat is developed. At the same time hydrogen gas is given off.

In using the heating device for heating a can of beans, for example, the paper 10 is cut around the upper edge of the element 7 so that the element is free to move with relation to the element 6. A nail 11 is then driven entirely through the element 7, as shown in Figure 2, which upon withdrawal allows the water in the element 7 to flow down into and mix with the lime contained in the element 6. The reaction between the lime and water develops heat which heats up the beans in the container. During the heating operation, hydrogen gas is liberated which, if not allowed to escape, might result in explosions. As the lime is slaked, it expands and evolves gas. This gas causes the element 7 to move upwardly with respect to the element 6 until it assumes the chain line position shown in Figure 3, thereby allowing the gas to escape from the heating element.

After the beans within the container have been heated to the desired temperature, which ordinarily takes only a few minutes, the cover 5 of the container is cut as indicated at 12 in Figure 4. The whole heating device with the cover 5 of the container is then removed from the container and thrown away. Thereafter the beans are removed from the container.

It will be noted that during the heating operation the material being heated is prevented from mixing with the substances contained in the heating device, and that the material being heated is prevented from boiling out of the container.

In the device above described, the heating element forms an integral part of the container having the material to be heated therein. In such devices the heating elements are associated with the cans by the manufacturer of the material contained within the cans.

In order to form an air tight seal between the elements 6 and 7, and to prevent their corrosion, the outer surfaces of the side walls of element 7 preferably are coated with paraffin or other suitable material before the elements are assembled.

It is to be understood that my invention is not limited to any particular substances which when mixed develop heat, as any suitable materials may be employed for this purpose.

I have described two preferred embodiments of my invention. It is understood, however, that the invention may be otherwise modified without departing from the spirit of the invention or the scope of the following claims.

I claim:

1. A food container comprising an outer casing, an annular cover for the container, an inner casing secured to the cover and extending into the container, and a receptacle slidable in said inner casing, said receptacle and said inner casing forming compartments adapted to contain substances which produce heat when mixed.

2. A food container comprising an outer casing, an annular cover for the container, an inner casing extending into the container, a receptacle slidable in said inner casing, the receptacle having a cover provided with a flange which cooperates with the annular cover of the container to limit the downward movement of the receptacle in the inner casing, and means for temporarily securing the receptacle in place within said inner casing, the receptacle being slidable in the inner casing after removal of said temporary securing means in order to relieve pressure developed when substances in the inner casing and receptacle are mixed to heat the container.

In testimony whereof I have hereunto set my hand.

STANLEY M. BIELEK.